Figure 1:
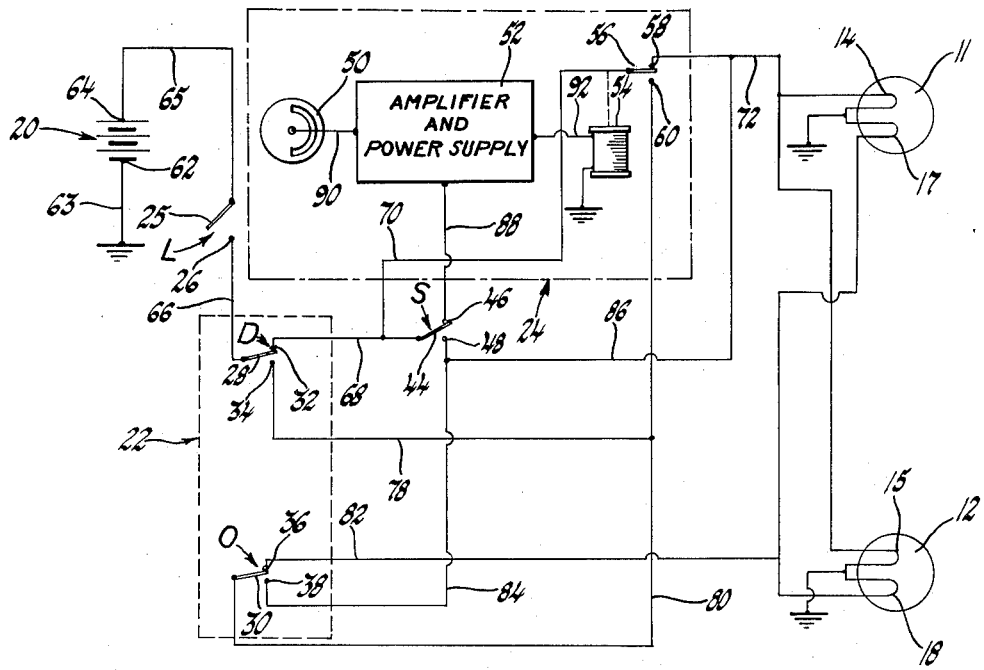

June 5, 1956

H. K. GANDELOT 2,749,478

AUTOMATIC HEADLIGHT CONTROL SYSTEM

Filed May 31, 1952

Inventor
Howard K. Gandelot
By Willits, Helmig & Baillio
Attorneys

United States Patent Office 2,749,478
Patented June 5, 1956

2,749,478

AUTOMATIC HEADLIGHT CONTROL SYSTEM

Howard K. Gandelot, Grosse Pointe Woods, Mich., assignor to General Motors Corporation, Detroit, Mich., a corporation of Delaware Application May 31, 1952, Serial No. 290,855

4 Claims. (Cl. 315—83)

This invention relates to vehicle illumination systems adapted for both conventional and automatic control of beam headlighting conditions and, more particularly, to a combined switching arrangement therefor which enables the operator to control the upper and lower beam lighting, when the system is conditioned for conventional or non-automatic operation, and to override or return from lower to upper beam lighting at will, when the system is conditioned for automatic operation.

In operating an automotive vehicle at night, upper beam lighting may be needed to illuminate the roadway a substantial distance ahead of the vehicle for safer driving. When operating with the headlights in upper beam condition, it is often necessary to revert to lower beam lighting when passing an approaching vehicle or when approaching a vehicle from the rear. For this purpose, there is provided a foot-operated beam control switch, commonly called a dimmer switch, which in one position completes or energizes the upper beam lighting circuit and in the other position the lower beam lighting circuit.

To promote still safer driving conditions, electronic switching devices have been incorporated in vehicle illumination systems for automatically controlling the beam lighting in response to the illumination from an oncoming vehicle or to roadway illumination. In such systems, it is especially desirable to provide some form of override or over-control means when the system is conditioned for automatic operation to enable the operator of a vehicle, the headlights of which have been switched automatically from upper to lower beam lighting in response to the illumination of an oncoming vehicle, to return momentarily to upper beam lighting for the purpose of reminding the driver of the oncoming vehicle that he has not switched to lower beam. Other functions served by the override means may be to flash signal and warn the driver of a vehicle being overtaken from behind for safer passing clearance, to retain upper beam lighting for safer driving under certain road conditions if the lights on the oncoming vehicle have not been lowered and to regain upper beam lighting for short periods under certain conditions of natural lighting such as may occur during twilight conditions.

The above functions cannot be obtained by use of the conventional beam control switch alone in a vehicle illumination system which incorporates an automatic headlight control apparatus, since in the upper beam lighting position, such switches generally are adapted to provide a selection of automatic or non-automatic control over the headlights and to provide lower beam lighting without automatic control in the other switch position. Thus, it would be necessary for the driver to operate a second and independent selector switch to change the lighting system from automatic to non-automatic operation in order to obtain the above safer driving features with the conventional foot operated dimmer switch, alone.

Further, while the illumination system is conditioned for non-automatic operation, the electronic circuits of the automatic control apparatus may not be energized and, consequently, in switching back to automatic operation with the aforementioned selector switch, there would be a highly undesirable time delay caused by warm-up of the electronic apparatus when meeting an oncoming vehicle just after switching from non-automatic back to automatic control.

Overriding control for switching from lower to upper beam condition may be provided, however, without disablement or de-energization of the automatic control apparatus when the illumination system is conditioned for automatic operation, by provision of a separate override control switch, connected, for example, in the lower beam lighting circuit, thereby permitting the operator to return his headlights which have been automatically switched to lower beam condition back to upper beam at will.

If the override switch, like the conventional beam control or dimmer switch, is foot-operated, both switches would be mounted fairly close together on the toeboard of the vehicle. As a consequence, the operator may confuse the switches and temporary loss of control over the headlight beam condition may result. This situation becomes more aggravated particularly in installations where a third foot switch is provided as for remote push-button tuning of a radio broadcast receiver installed in the vehicle.

Accordingly, it is the object of my invention to provide a simplified switching arrangement in a vehicle illumination system adapted for both conventional and automatic control of the vehicle headlighting conditions. Another object is to provide a combined dimmer and override switch in a vehicle illumination system adapted for both conventional and automatic control of upper and lower beam headlighting conditions. Other objects are to provide a simple and effective switching arrangement in a vehicle illumination system of the above described character which incorporates the desirable features attending the use of an override control switch, while maintaining the number of foot switches at a minimum.

Figure 2:
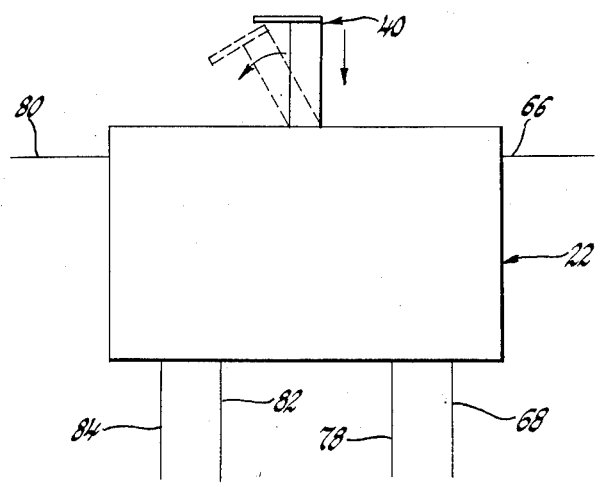

The preferred manner in which the above and other objects are realized, together with the features and advantages attending my invention, will appear more fully from the following detailed description and accompanying drawings, in which:

Fig. 1 is a wiring diagram of a vehicle illumination system in accordance with a preferred embodiment of my invention; and Fig. 2 diagrammatically illustrates a form of switching device suitable for use in the system of Fig. 1.

The circuit diagram shown in Fig. 1 of the drawings comprises, in general, a pair of multiple filament headlights 11, 12 each of which includes an upper beam filament 14, 15 and lower beam filament 17, 18, respectively; a source of electric energy 20; a main lighting switch L; an integral foot-operated switching arrangement 22 comprising a beam control or dimmer switch D and an override switch O; a selector switch S; and an automatic headlight control device 24.

The source 20 may be a suitable source of electric energy such as the vehicle storage battery. The main lighting switch L, which is shown as a single position switch having a switch arm 25 and energizable contact 26, may be mounted on the vehicle instrument panel and could be, for example, one section of the lighting control switch for turning the headlights 11, 12 and parking lights (not shown) on and off.

The beam control or dimmer switch D and the override switch O of the integral switching arrangement 22 are both shown as two-position switches, the respective switch arms 28 and 30 of each of which are associated with separate pairs of stationary contacts 32, 34 and 36, 38, respectively. The switches D and O are adapted to be actuated by a common actuator 40 (Fig. 2), which is capable of, say, full movement to actuate the beam control switch D without affecting the position of the override switch O and of, say, partial movement to actuate the override switch O without affecting the beam control switch D. A switch suitable for use herein is disclosed in my co-pending application S. N. 202,838, filed December 27, 1950, now Pat. No. 2,661,400, and assigned to the present assignee. In this application I provide a switch of the plunger variety which is capable of two independent modes of operation and in which the plunger, corresponding to the actuator 40, completes the upper beam lighting circuit, when the plunger or actuator is in its normal position, and the lower beam lighting circuit, when the actuator is depressed a full stroke and returned to its normal position. The switch is so constructed that when the lower beam lighting circuit is completed or energized, the plunger can be rocked readily between the positions shown in Fig. 2 to disconnect temporarily the lower beam lights and to connect temporarily the upper beam lights.

The selector switch S, which is shown as a two-position switch having a switch arm 44 associated with a pair of contacts 46, 48, may be mounted on the vehicle instrument panel, for example, within reach of the operator and functions to provide a selection of automatic or non-automatic operation when the dimmer switch D is in its upper beam position, as will appear hereinafter. The automatic headlight control apparatus 24, enclosed in dashed outline in Fig. 1, comprises a light-sensitive pickup device 50, such as a photoemissive cell, an electronic amplifier and power supply 52 and a relay coil 54, the latter having an armature 56 and an upper contact 58 and lower contact 60. The automatic control apparatus 24 may be of the type more fully disclosed in co-pending applications Serial No. 248,498, filed September 27, 1951, in the names of Chas. W. Miller, Harold E. Todd and George W. Onksen and Serial No. 251,158, filed October 13, 1951, in the name of James H. Guyton, both of which are assigned to the present assignee.

Referring now to the specific wiring of connections of the circuit of Fig. 1, the negative terminal 62 of the battery 20 is connected to ground through a conductor 63, the positive battery terminal 64 being connected through conductor 65 to the switch arm 25 of the main lighting switch L. Contact 26 of switch L is connected through conductor 66 to the switch arm 28 of the dimmer switch D. Contact 28 of the dimmer switch D is connected through conductor 68 to the switch arm 44 of the selector switch S and through conductor 70 to the armature 56 of the relay coil 54, the armature 56 of the relay 54 normally being in engagement with the upper contact 58 thereof. Upper contact 58 of the relay is connected through conductor 72 to one side of each of the upper beam filaments 14, 15 of the vehicle headlights 11, 12, respectively, the other side of each of the upper beam filaments being connected to ground, as shown.

Contact 34 of the dimmer switch D is connected to conductor 78 which is connected to conductor 80 between the lower contact 60 of the relay 54 and the switch arm 30 of the override switch O. The override switch O normally completes the lower beam lighting circuit through conductor 82 connected to one side of each of the low beam filaments 17, 18, the other side of each of which is connected to ground. Contact 38 of the override switch O is connected to contact 48 of the selector switch S through conductor 84 and to conductor 72 in the high beam lighting circuit through conductor 86. Contact 46 of the selector switch is connected through conductor 88 to the power supply of the amplifier 52 in the automatic dimmer apparatus 24.

The output of the photocell 50 of the automatic headlight control apparatus is connected through conductor 90 to the input of the amplifier and power supply 52. The signal output of the amplifier portion of 52 is connected through conductor 92 to one side of the relay coil 54, the other side of which is grounded.

The upper beam lighting circuit may be traced from ground, battery 20, conductor 65, switch L, conductor 66, switch arm 28 and contact 32 of the dimmer switch D, conductors 68 and 70, armature 56 and contact 58 of the relay 54, conductor 72, the upper beam filaments 14, 15 and back to ground. With the selector switch S in engagement with contact 48 for conventional or non-automatic operation, that portion of the upper beam lighting circuit which includes conductor 70 and armature 56 and contact 58 of the relay 54 is shunted by conductor 86. The lower beam lighting circuit may be traced similarly from ground, battery 20, conductor 65, switch L, conductor 66, switch arm 28 and contact 34 of the dimmer switch D, conductors 78 and 80, switch arm 30 and contact 36 of the override switch O, conductor 82, the lower beam filaments 17 and 18 and back to ground.

With switch arm 28 of the dimmer switch D in its upper beam position on contact 32, a selection of automatic or non-automatic control of the headlights is afforded by the selector switch S. With switch arm 44 of the selector switch S in engagement with contact 48, the system is conditioned for conventional or non-automatic operation and alternate energization of the upper and lower beam lighting circuits is obtained with the dimmer switch D depending upon the position of switch arm 28. With the switch arm 28 of the dimmer switch in its lower beam position in engagement with contact 34, the actuator 40 may be rocked to and fro to provide flash signaling with the upper beam lights when overtaking a vehicle from behind, as mentioned above. With the switch arm 28 of the dimmer switch D in its upper beam position in engagement with contact 32 and with switch arm 44 of the selector switch S in engagement with contact 46, the illumination system is conditioned for automatic operation and current is supplied from the battery 20 to the automatic headlight control apparatus 24.

Under automatic operating conditions and in the absence of external illumination on the photocell 50 from the roadway or an oncoming vehicle, the armature 56 of the relay 54 is in the position shown and completes the upper beam lighting circuit. Application of illumination above a predetermined intensity level on the photocell 50 causes the relay 54 to open the upper beam lighting circuit and to complete the lower beam lighting circuit through lower contact 60, conductor 80 and the override switch O. In the event that the operator of the approaching vehicle has failed to shift his lights, the override switch O may then be actuated by rocking the actuator 40 to open the lower beam circuit 36 and to close the upper beam circuit through contact 38, conductors 84, 86 and 72, thereby permitting flash signaling with the upper beam lights with the same actuator used to provide different headlighting conditions under conventional or non-automatic operating conditions.

Although the invention has been described in connection with and reference to a particular form of combined dimmer and override switch, other switch forms may be employed which provide a common actuator capable of independently actuating two or more switches.

I claim:

1. In a multi-filament headlight illumination system including a source of power; upper beam and lower beam lighting circuits; manual beam selector switching means connected in said circuits and operable between a high beam selector contact and a low beam selector contact to selectively connect said lighting circuits for energization from said power source; automatic dimming means energized from said power source and comprising light sensitive means and relay means including first and second contacts and having an armature connected to said high beam selector contact, said armature being movable in accordance with the intensity of illumination impinging on said light sensitive means to engage said first contact to normally complete said upper beam lighting circuit through said upper beam selector contact to said power source, and to engage said second contact to disable said upper beam lighting circuit and connect said lower beam lighting circuit for actuation through said upper beam selector contact to said power source; and separate manually operated override switching means including a switch arm connected to said second contact and movable between two contact points, said override switching means normally contacting one of said two contact points and completing said lower beam lighting circuit from said power source through said beam selector switching means, said armature, said switch arm, and said one of said two contact points, to said power source, and movable to the other of said two contact points to disable said lower beam lighting circuit and complete said upper beam lighting circuit from said power source through said beam selector switching means, said armature, said switch arm, and said other of said two contact points to said power source; said beam selector switching means and said override switching means having a common actuator characterized by at least two independent modes of actuation, whereby either of said switching means may be actuated without affecting the other.

2. In a multi-filament vehicle headlight illumination system including a source of power; upper beam and lower beam lighting circuits; manual beam selector switching means operable between a high beam selector position and a low beam selector position and selectively completing said lighting circuits for energization from said power source; automatic dimming means energized from said power source and including light sensitive means and relay means controlled from said light sensitive means between first and second positions determined by the intensity of the illumination impinging on said light sensitive means, said relay means when in said first position normally completing said upper beam lighting circuit for energization from said power source and when in said second position disabling said upper beam lighting circuit and completing said lower beam lighting circuit for such energization; and separate override switching means manually operable between two positions different from said selector positions of said beam selector switching means, said override switching means when in one of said two positions normally completing said lower beam lighting circuit for energization from said power source through said beam selector switching means and said relay means when said relay means is in said second position, and when in the other of said two positions completing said upper beam lighting circuit for energization from said power source through said beam selector switching means and said relay means when said relay means is in said second position whereby said upper beam lighting circuit may be maintained energized irrespective of the intensity of illumination impinging on said light sensitive means when said override switch means is in said other of said two positions, said beam selector switching means and said override switching means having a common actuator characterized by at least two independent modes of actuation, whereby either of said switching means may be actuated without affecting the other.

3. In a multi-filament vehicle illumination system including a source of power; upper beam and lower beam lighting circuits; manual beam selector switching means having a single movable switch element manually operable between a high beam selector position and a low beam selector position and selectively completing said lighting circuits for energization from said power source; automatic headlight control means energized from said power source and including light sensitive means and relay switching means controlled from said light sensitive means between first and second positions determined by the intensity of illumination impinging upon said light sensitive means, said relay switching means when in said first position normally completing said upper beam lighting circuit for energization from said power source and when in said second position disabling said upper beam lighting circuit and completing said lower beam lighting circuit for such energization; and separate override switching means having a single movable switch element manually operable between two positions different from said selector positions of said beam selector switching means, said override switching means when in one of said two positions normally completing said lower beam lighting circuit through said relay means and said beam selector switching means for energization from said power source; and when in the other of said two positions disabling said lower beam energizing circuit and completing said upper beam lighting circuit for such energization; said beam selector switching means and said override switching means having a common actuator for the said movable elements thereof characterized by at least two independent modes of actuation, whereby either of said switching means may be actuated without affecting the other.

4. In a multi-filament vehicle illumination system including a source of power; upper beam and lower beam lighting circuits; manual beam selector switching means having a single movable switch element operable between a high beam selector position and a low beam selector position and selectively completing said lighting circuits for energization from said power source; automatic headlight control means including light sensitive means and relay switching means controlled from said light sensitive means between first and second positions determined by the intensity of illumination impinging upon said light sensitive means, said relay switching means when in said first position normally completing said upper beam lighting circuit and when in said second position disabling said upper beam lighting circuit and completing said lower beam lighting circuit; selector switching means in circuit with said power source and said automatic control means and connecting said automatic headlight control means for energization from said power source; and separate override switching means having a single movable switch element manually operable between two positions different from said selector positions of said beam selector switching means, said override switching means when in one of said two positions normally completing said lower beam lighting circuit through said relay means and said beam selector switching means for energization from said power source, and when in said other of said two positions disabling said lower beam energizing circuit and completing said upper beam lighting circuit for such energization; said beam selector switching means and said override switching means having a common actuator for the said movable elements thereof characterized by at least two independent modes of actuation, whereby either of said switching means may be actuated without affecting the other.

References Cited in the file of this patent
UNITED STATES PATENTS
2,431,394  Friedman _____ Nov. 25, 1947